US009983925B2

United States Patent
Dono et al.

(10) Patent No.: US 9,983,925 B2
(45) Date of Patent: May 29, 2018

(54) APPARATUSES AND METHODS FOR FIXING A LOGIC LEVEL OF AN INTERNAL SIGNAL LINE

(71) Applicant: Micron Technology, Inc., Boise, ID (US)

(72) Inventors: Chiaki Dono, Tokyo (JP); Seiichi Maruno, Tokyo (JP); Taihei Shido, Tokyo (JP); Toshio Ninomiya, Tokyo (JP); Chikara Kondo, Tokyo (JP)

(73) Assignee: Micron Technology, Inc., Boise, ID (US)

( * ) Notice: Subject to any disclaimer, the term of this patent is extended or adjusted under 35 U.S.C. 154(b) by 0 days. days.

(21) Appl. No.: 14/678,375

(22) Filed: Apr. 3, 2015

(65) Prior Publication Data

US 2016/0034340 A1 Feb. 4, 2016

(30) Foreign Application Priority Data

Apr. 11, 2014 (JP) ................................. 2014-082222
Apr. 23, 2014 (JP) ................................. 2014-088960

(51) Int. Cl.
*G11C 29/00* (2006.01)
*G06F 11/10* (2006.01)

(52) U.S. Cl.
CPC ...... *G06F 11/1004* (2013.01); *G06F 11/1016* (2013.01)

(58) Field of Classification Search
CPC .......................... G06F 11/1004; G06F 11/1016
See application file for complete search history.

(56) References Cited

U.S. PATENT DOCUMENTS

2009/0319877 A1* 12/2009 Bains .................. G06F 11/1004
714/807
2013/0061102 A1* 3/2013 Sohn .................... G11C 7/1006
714/718
2013/0311717 A1* 11/2013 Kim ..................... G06F 12/0246
711/104
2014/0016404 A1* 1/2014 Kim ...................... G11C 11/165
365/158

FOREIGN PATENT DOCUMENTS

JP 2011-187153 9/2011
JP 2013-073664 4/2013

* cited by examiner

*Primary Examiner* — Sam Rizk
(74) *Attorney, Agent, or Firm* — Dorsey & Whitney LLP

(57) ABSTRACT

A control circuit receives the mode signals supplied from a mode register and a read enable signal READ supplied from a control logic circuit, which activates enable signals EN1 to EN3 based on the mode signals and read enable signal. For example, the read enable signal READ is activated when a read command is issued from the controller. One mode signal can indicate an operation mode in which a multi-purpose register is used, and another mode signal can indicate an operation mode in which the data bus inversion function is used. When a data masking operation is disabled and an error check operation is enabled, the mode register activates a protection signal SEL. When the data masking operation is enabled or the error check operation is disabled, the protection signal SEL is deactivated. The operation of a deserializer is controlled by clock signals and the protection signal SEL.

20 Claims, 17 Drawing Sheets

Order of burst input →

| | | | | | | | | | |
|---|---|---|---|---|---|---|---|---|---|
| DQ0 | DQ00 | DQ10 | DQ20 | DQ30 | DQ40 | DQ50 | DQ60 | DQ70 | CRC0 |
| DQ1 | DQ01 | DQ11 | DQ21 | DQ31 | DQ41 | DQ51 | DQ61 | DQ71 | CRC1 |
| DQ2 | DQ02 | DQ12 | DQ22 | DQ32 | DQ42 | DQ52 | DQ62 | DQ72 | CRC2 |
| DQ3 | DQ03 | DQ13 | DQ23 | DQ33 | DQ43 | DQ53 | DQ63 | DQ73 | CRC3 |
| DQ4 | DQ04 | DQ14 | DQ24 | DQ34 | DQ44 | DQ54 | DQ64 | DQ74 | CRC4 |
| DQ5 | DQ05 | DQ15 | DQ25 | DQ35 | DQ45 | DQ55 | DQ65 | DQ75 | CRC5 |
| DQ6 | DQ06 | DQ16 | DQ26 | DQ36 | DQ46 | DQ56 | DQ66 | DQ76 | CRC6 |
| DQ7 | DQ07 | DQ17 | DQ27 | DQ37 | DQ47 | DQ57 | DQ67 | DQ77 | CRC7 |

| | | | | | | | | |
|---|---|---|---|---|---|---|---|---|
| DM | DM0 | DM1 | DM2 | DM3 | DM4 | DM5 | DM6 | DM7 |

FIG. 4

Output Order(n) →

FIG. 13 (A)

| DQ(m) | D0 | D1 | D2 | D3 | D4 | D5 | D6 | D7 |
|---|---|---|---|---|---|---|---|---|
| DQ0 | 1 | 1 | 1 | 1 | 1 | 1 | 1 | 1 |
| DQ1 | 1 | 1 | 1 | 1 | 1 | 1 | 1 | 0 |
| DQ2 | 1 | 1 | 1 | 1 | 1 | 1 | 0 | 0 |
| DQ3 | 1 | 1 | 1 | 1 | 1 | 0 | 0 | 0 |
| DQ4 | 1 | 1 | 1 | 1 | 0 | 0 | 0 | 0 |
| DQ5 | 1 | 1 | 1 | 0 | 0 | 0 | 0 | 0 |
| DQ6 | 1 | 1 | 0 | 0 | 0 | 0 | 0 | 0 |
| DQ7 | 1 | 0 | 0 | 0 | 0 | 0 | 0 | 0 |

FIG. 13 (A)

Output Order(n) →

| DQ(m) | D0 | D1 | D2 | D3 | D4 | D5 | D6 | D7 |
|---|---|---|---|---|---|---|---|---|
| DQ0 | 1 | 1 | 1 | 1 | 1 | 0 | 0 | 0 |
| DQ1 | 1 | 1 | 1 | 1 | 1 | 0 | 0 | 1 |
| DQ2 | 1 | 1 | 1 | 1 | 1 | 0 | 1 | 1 |
| DQ3 | 1 | 1 | 1 | 1 | 1 | 1 | 1 | 1 |
| DQ4 | 1 | 1 | 1 | 1 | 0 | 1 | 1 | 1 |
| DQ5 | 1 | 1 | 1 | 0 | 0 | 1 | 1 | 1 |
| DQ6 | 1 | 1 | 0 | 0 | 0 | 1 | 1 | 1 |
| DQ7 | 1 | 0 | 0 | 0 | 0 | 1 | 1 | 1 |
| DBI | 1 | 1 | 1 | 1 | 1 | 0 | 0 | 0 | inverted

FIG. 13 (B)

| | | Data Bus Inversion | |
|---|---|---|---|
| | | Enable (MODE3) | Disable (MODE4) |
| MPR | Enable (MODE1) | (Condition B)<br><br>EN2<br>EN3 | (Condition C)<br><br>EN2 |
| | Disable (MODE2) | (Condition A)<br>EN1<br>EN2<br>EN3 | (Condition D)<br>EN1<br>EN2 |

FIG. 16

APPARATUSES AND METHODS FOR FIXING A LOGIC LEVEL OF AN INTERNAL SIGNAL LINE

PRIORITY

This application is based upon and claims the benefit a priority from Japanese Patent Applications No. 2014-082222 filed on Apr. 11, 2014 and No. 2014-088960 filed on Apr. 23, 2014, the disclosures of which are incorporated herein in their entirely by reference.

BACKGROUND

Recently, a DDR (Double Data Rate) 4 DRAM (Dynamic Random Access Memory) which has faster processing speed than a DDR 3 DRAM has been used. The DDR 4 DRAM has additional functions that are not included in the DDR 3 DRAM, such as a CRC (Cycle Redundancy Cheek) function and DBI (Data Bus Inversion function. Japanese Patent Application Laid-Open No. 2013-73664 discloses the CRC function which is for checking whether an error is included in write data. Japanese Patent Application Laid-Open No. 2011-187153 shows the DB1 function which is for reducing current consumption resulting from data transfer by reversing the logical level of read data or write data that is input or output simultaneously when a given condition is met.

According to the CRC function, the DRAM performs logic operations on write data to generate a CRC code, and compares the generated CRC code with an input CRC code, thereby checking whether an error is included in the write data.

The CRC code is generated based on not only the write data but also an input signal from a data mask terminal. Input signals from the data mask terminal include data mask signals and data bus inversion signals related to the above DBI function.

The DDR 4 DRAM includes a register called a multipurpose register that is separate from a memory cell array. During initialization following power on, a training operation using the multi-purpose register is carried out to minutely adjust read timing.

BRIEF DESCRIPTION OF THE DRAWINGS

FIG. 4 depicts order of burst input of write data and data mask signals;

FIGS. 13(A) and 13(B) are diagrams for explaining a function of a data bus inversion circuit according to the embodiment of the present invention;

FIG. 16 depicts an operation of a control circuit according to the embodiment of the present invention.

DETAILED DESCRIPTION

Certain details are set forth below to provide a sufficient understanding of embodiments of the invention. However, it will be clear to one skilled in the art that embodiments of the invention may be practiced without these particular details. Moreover, the particular embodiments of the present invention described herein are provided by way of example and should not be used to limit the scope of the invention to these particular embodiments. In other instances, well known circuits, control signals, timing protocols, and software operations have not been shown in detail in order to avoid unnecessarily obscuring the invention.

Figure 1:
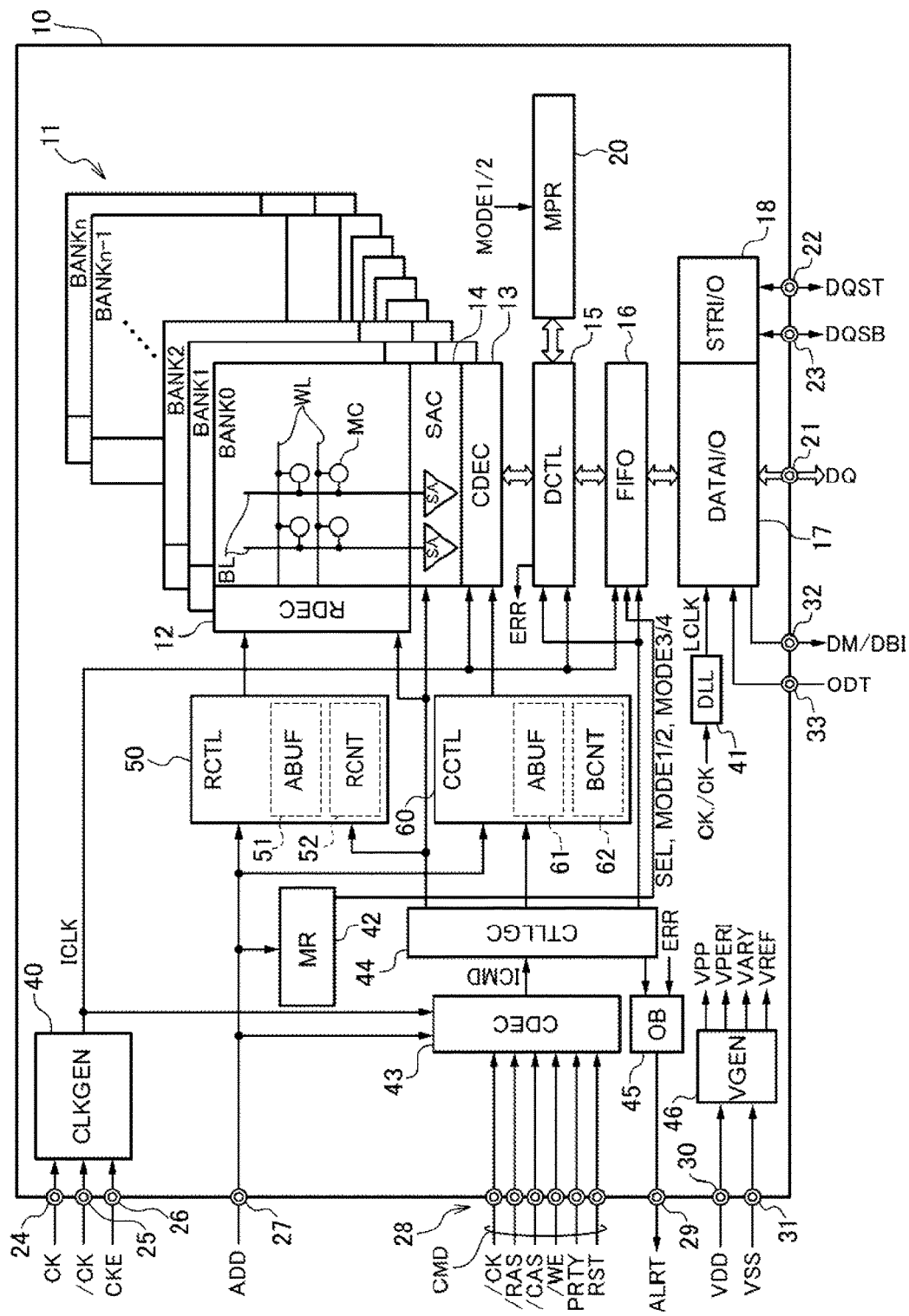
FIG. 1 is a functional block diagram of a semiconductor device according to an embodiment of the present invention.

FIG. 1 is a block diagram showing the functional block diagram of a semiconductor device 10 according to embodiments of the present invention.

The semiconductor device 10 of the embodiments is a DRAM integrated in one semiconductor chip. As shown in FIG. 1, the semiconductor device 10 includes a memory cell array 11 divided into n+1 banks.

The memory cell array 11 has plural word lines WL and bit lines BL intersecting with each other, and memory cells MC arranged at the intersections of the word lines WL and bit lines BL. A word line WL is selected by the row decoder 12, while a bit line UL is selected by a column decoder 13. Each bit line BL is connected to a respective sense amplifier SA in a sense circuit 14, and a bit line DL selected by the column decoder 13 is connected to a data controller 15 via the sense amplifier SA. The data controller 15 includes a main amplifier and an error check circuit, which will be described later, and is connected to a data input/output circuit 17 via an FIFO circuit 16. The data input/output circuit 17 inputs and outputs data via a data input/output terminal 21.

In addition to the data input/output terminal 21, the semiconductor device 10 also includes other external terminals, such as strobe terminals 22 and 23, clock terminals 24 and 25, a clock enable terminal 26, an address terminal 27, a command terminal 28, an alert terminal 29, power terminals 30 and 31, a DM/DBI terminal 32, and an ODT terminal 33.

The clock terminals 24 and 25 receive external clock signals CK and /CK, respectively. In this specification, a signal with as "/" at the beginning of as signal name represents an inverted signal of as corresponding signal, or represents as low-active signal. A clock generator 40 is activated based on a clock enable signal CKE, and generates an internal clock signal ICLK. A DLL circuit 41 generates a phase-controlled output clock signal LCLK, based on the external clock signals CK and /CK.

The address terminal 27 receives an address signal ADD. A row control circuit 50 is a circuit block including an address buffer 51 and a refresh counter 52. A column control circuit 60 is a circuit block including an address buffer 61 and a burst counter 62.

Information indicative of an operation mode of the semiconductor device 10 is registered in a mode register 42. Information registered in the mode register 42 at least includes information indicative of whether or not to carry out a data masking operation on write data DQ based on data mask signals DM (data mask information), and information indicative of whether or not to carry out an error check operation at the error check circuit, that is, information indicative of whether or not to activate a CRC function. When the data masking operation is disabled (DM disable mode) and the error check operation is enabled (CRC enable mode), the mode register 42 activates a protection signal SEL. In other words, when the data masking operation is enabled (DM enable mode) or the error check operation is disabled (CRC disable mode), the protection signal SEL is deactivated.

Other information registered in the mode register 42 includes information indicative of whether or not to use the multi-purpose register 20 and information indicative of whether or not to enable a DBI function.

When a use of the multi-purpose register 20 is disabled, a read operation and a write operation are performed on the memory cell array 11. When the use of the multi-purpose register 20 is enabled, the read operation and the write operation are performed on the multi-purpose register 20. During a training operation, therefore, the use of the multi-purpose register 20 is enabled.

When the DBI function is enabled, the semiconductor device 10 provide a controller with data bus invention signals DBI (data bus inversion information) which indicate whether or not the logic level of read data DQ is inverted. When the DBI function is disabled, the logic level of the read data DQ is not inverted, therefore, the data bus inversion signals DBI are invalidated.

The use of the multi-purpose register 20 is enabled or disabled responsive to a mode signal MODE1/2 provided by the mode register 42. Similarly, the DBI function is enabled or disabled responsive to a mode signal MODE3/4 provided by the mode register 42.

The command terminal 28 receives a command signal. The command decoder 43 generates an internal, command ICMD, based on the command signal CMD. A control logic circuit 44 controls operations of the row control circuit 50, the column control circuit 60, the data controller 15, etc., based on the internal command ICMD.

The power terminals 30 and 31 are supplied with power voltages VDD and VSS, respectively.

The DM/DBI terminal 32 receives the data mask signals DM, and outputs data bus inversion signals DBI. The ODT terminal 33 is a terminal supplied with a termination signal ODT.

Figure 2:
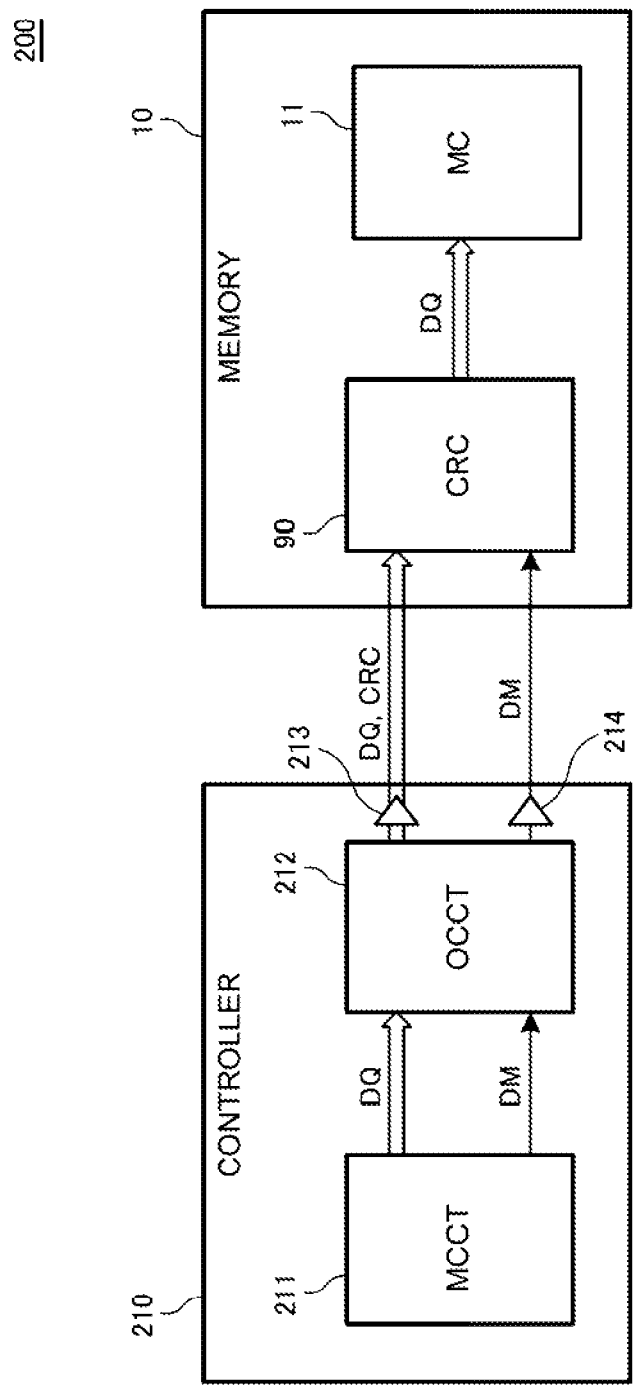
FIG. 2 is a functional block diagram of a data processing system including the semiconductor device according to the embodiment of the present invention.

FIG. 2 is a functional block diagram of a data processing system 200 including the semiconductor device 10 according to a first embodiment of the present invention.

The data processing system 200 of FIG. 2 includes the semiconductor device 10 and a controller 210 that controls the semiconductor device 10. The controller 210 includes a main circuit 211 that generates write data DQ and the data mask signals DM, and an error check signal generation circuit 212 that generates a. CRC code. The error check signal generation circuit 212 performs a CRC operation (an error check operation) on the write data DQ and the data mask signals DM, and thereby generates the CRC code corresponding to the write data DQ and data mask signals DM. The word error check operation herein may include not only the CRC operation but also other error check operations. Furthermore, the word error check operation herein may also include not only error cheek operations but also error correction operations such as an FCC operation. The CRC code generated by the error cheek signal generation circuit 212 is added to the end of the write data DQ, and is burst output from the controller 210 through an output huller 213 and burst input to the semiconductor device 10. The data mask signals DM are burst output from the controller 210 through an output buffer 214 and burst input to the semiconductor device 10.

The write data DQ, data mask signals DM, and CRC code burst input to the semiconductor device 10 are input to the error check circuit 90. The error check circuit 90, which will be described in detail later, performs CRC operation on the write data DQ and the data mask signals DM, and thereby generates a CRC code (first encoded signal). The error check circuit 90 may perform the same CRC operation as that performed by the error check signal generation circuit 212 in the controller 210. The error check circuit 90 then compares the CRC code generated thereby with the CRC code provided by the controller 210, and determines whether both codes match or not. By this process, whether or not an error is included in the write data DQ or data mask signals DM can be determined.

When it is determined that no error is included in the write data DQ or data mask signals DM, the write data DQ are written into the memory cell array 11. When the data mask signals DM are activated, the write data DQ is masked to prohibit writing of the write data DQ to the memory cell array 11.

The semiconductor device 10 of this embodiment will be further described in detail below with focusing on the write operation. It is assumed that, in this embodiment, the DBI function is disabled.

Figure 3:
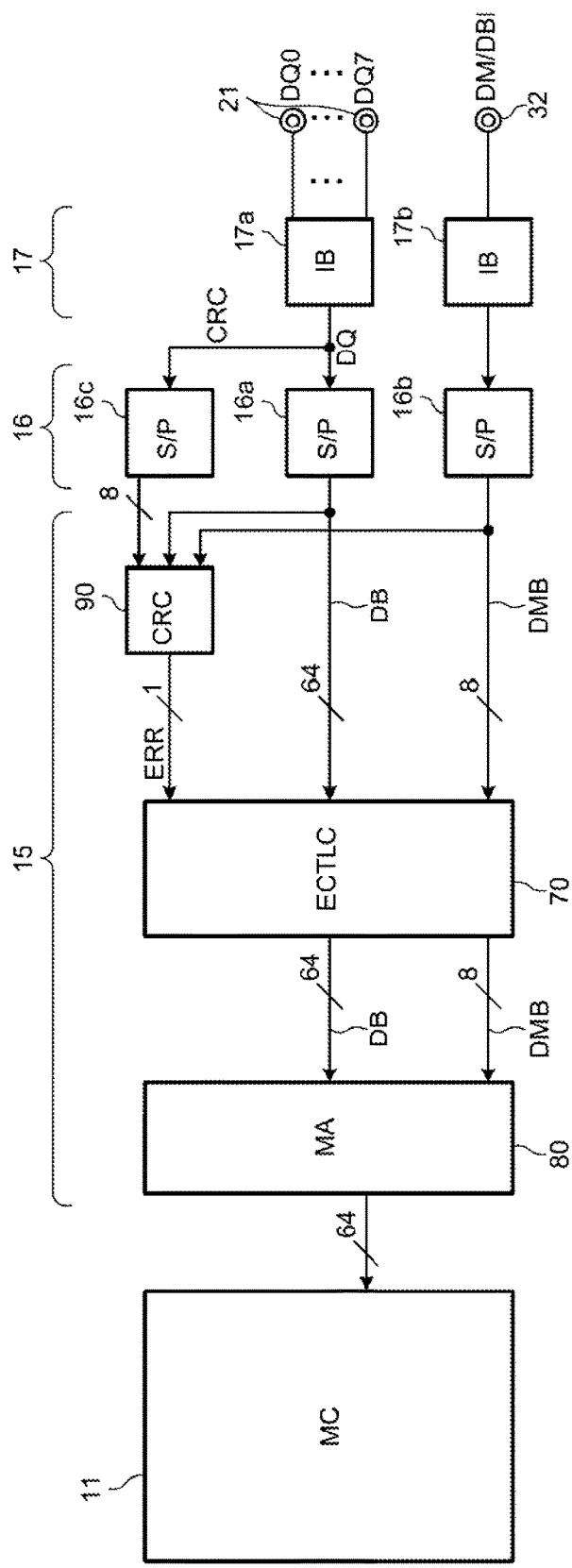
FIG. 3 is a functional block diagram of a part of the semiconductor device that is related to a write operation according to the embodiment of the present invention.

FIG. 3 is a functional block diagram of a part of the semiconductor device 10 that is related to the write operation.

As shown in FIG. 3, according to this embodiment, the semiconductor device 10 includes 8 data input/output terminals 21, from which write data DQj0 to DQj7 (j=0 to 7) of 8 bits are input to the semiconductor device 10 via an input buffer 17a. Because the DDR 4 DRAM employs an 8-bit pre-fetch method, write data DQ0k to DQ7k (k=0 to 7) of 8 bits are burst input to one data input/output terminal 21 for one write operation. As shown in FIG. 4, according to this embodiment, following burst input of the write data DQ, a CRC code of one bit is provided to each data input/output terminal 21 via the input buffer 17a. For one write operation, therefore, the write data DQ of 64 bits and CRC codes of 8 bits, i.e., signals of 72 bits in total, are supplied via the data input/output terminals 21. Out of these signals of 72 bits (DQ, CRC), the write data DQ of 64 bits are converted into parallel signals through a serial/parallel conversion circuit (S/P) 16a included in the FIFO circuit 16, and the CRC codes of 8 bits are converted into parallel signals through a serial/parallel conversion circuit (S/P) 16c included in the FIFO circuit 16.

Meanwhile, to the DM/DBI terminal 32, data mask signals DM0 to DM7 of 8 bits are burst input via an input buffer 17b in synchronization with burst input of the write data DQ0k to DQ7k. If the data mask signals DMj are at an active level, it invalidates the write data DQj0 to DQj7 of 8 bits input at the timing of burst input of each data mask signals. The data mask signals DM0 to DM7 of 8 bits are converted into parallel signals through a serial/parallel conversion circuit (S/P) 16b included in the FIFO circuit 16.

The write data DQ of 64 bits output from the serial/parallel conversion circuit 16a are supplied to a 64-bit wide data line DB. The data mask signals DM of 8 bits output from the serial/parallel conversion circuit 16b are supplied to a 8-bit wide data mask line MB. As shown in FIG. 3, each of the data line DB and the data mask line DMB is coupled to a main amplifier 80 via an error control circuit 70. These error control circuit 70 and main amplifier 80 are circuit blocks included in the data controller 15 of FIG. 1.

The write data DQ of 64 bits provided b the serial/parallel conversion circuit 16a, the CRC codes of 8 bits provided by the serial/parallel conversion circuit 16c, and the data mask signals DM of 8 bits provided by the serial/parallel conversion circuit 161, i.e., signals of 80 bits in total, are supplied to the error check circuit 90 included in the data controller 15. The error check circuit 90 performs CRC operation and comparison, using these signals of 80 bits, and thereby determines whether or not an error is included in the write data DQ or data mask signals DM. When it is determined that an error is included in the write data DQ or data mask signals DM, an error signal ERR is set to an active level. When an error is not included an error signal ERR is set to an inactive level.

The write data DQ and data mask signals DM having passed through the error control circuit 70 are supplied to the main amplifier 80. Out of the write data DQ of 64 bits, the main amplifier 80 writes a block of write data DQ corresponding to data mask signals DM at the inactive level to the memory cell array 11, while suspends writing of a block of write data DQ corresponding to data mask signals DM at the active level to the memory cell array 11. In this manner, writing, of the write data DQ is controlled based on the data mask signals DM.

When the error signal ERR is set to the active level, the error control circuit 70 changes all of the data mask signals DM0 to DM7 of 8 bits on the data mask line DMB into the active level, regardless of the logic level of the data mask signals DM supplied from the controller 210. As a result, when an error is included in a block of write data DQ, writing of the entire block of write data DQ is suspended. The error signal ERR is supplied also to an output circuit 45 shown in FIG. 1. This allows the controller 210 to check the occurrence of a CRC error.

Figure 5:
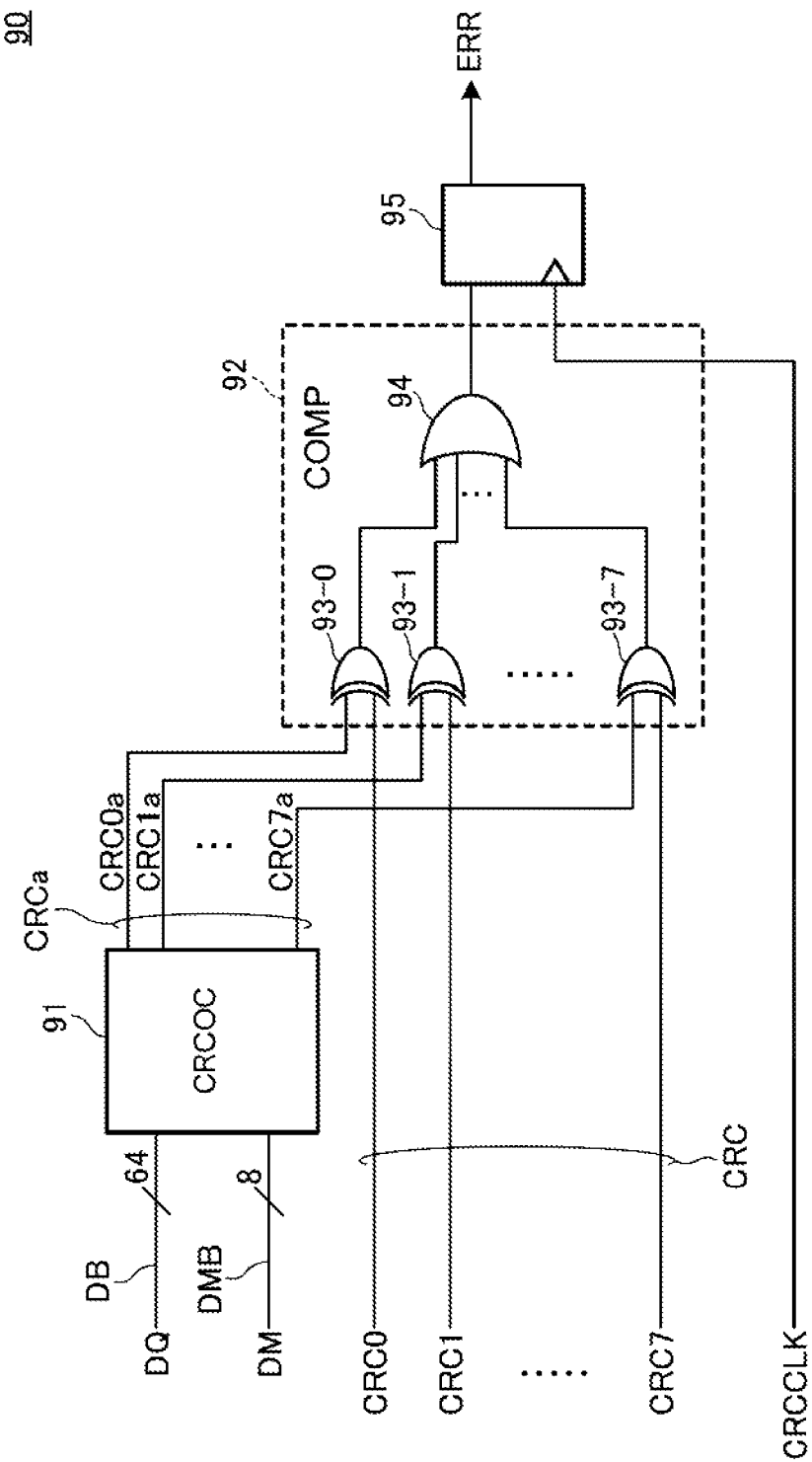
FIG. 5 a circuit diagram of a verification circuit according to the embodiment of the present invention.

FIG. 5 is a circuit diagram of the error check circuit 90.

As shown in FIG. 5, the write data DQ of 64 bits, the data mask signals DM of 8 bits, and the CRC codes of 8 bits are input to the error check circuit 90. The write data DQ of 64 bits are input via the data line DB, and the data mask signals DM of 8 bits are input via, the data mask lines DMB. The write data DQ of 64 bits and data mask signals DM of 8 bits are supplied to an operation circuit 91, which performs predetermined CRC operation to generate CRC codes of 8 bits.

To generate each of hits CRC0a to CRC7a making up the CRC codes, at least one of the data mask signals DM0 to DM7 is used for operation. This means that even when the OM disable mode is selected, CRC operation requires the data mask signals DM0 to DM7.

The CRC codes generated by the operation circuit 91 are compared by a comparator circuit 92 with externally input CRC codes. The comparator circuit 92 carries out its comparison operation in such a way that it compares each of bits CRC0 to CRC7 making up the externally input CRC codes with each of hits CRC0a to CRC7a making up the CRC codes generated by the operation circuit 91 to determine whether all of the bits of both codes match or not. As shown in FIG. 5, the comparator circuit 92 includes 8 exclusive-OR circuits 93-0 to 93-7 that compare each pair of bits, and an 8-input OR-gate circuit 94 that receives output signals from the exclusive-OR circuits 93-0 to 93-7.

In this configuration, if any one of the bits CRC0 to CRC7 of the externally input CRC codes does not match a respective one of the bits CRC0a to CRC7a of the CRC codes generated by the operation circuit 91, an output signal from the comparator circuit 92 becomes a high level. The output signal from the comparator circuit 92 is latched by a latch circuit 95 in synchronization with a clock signal CRCCLK.

The latch circuit 95 then outputs an error signal ERR, which is supplied to the error control circuit 70 of FIG. 3.

Figure 6:
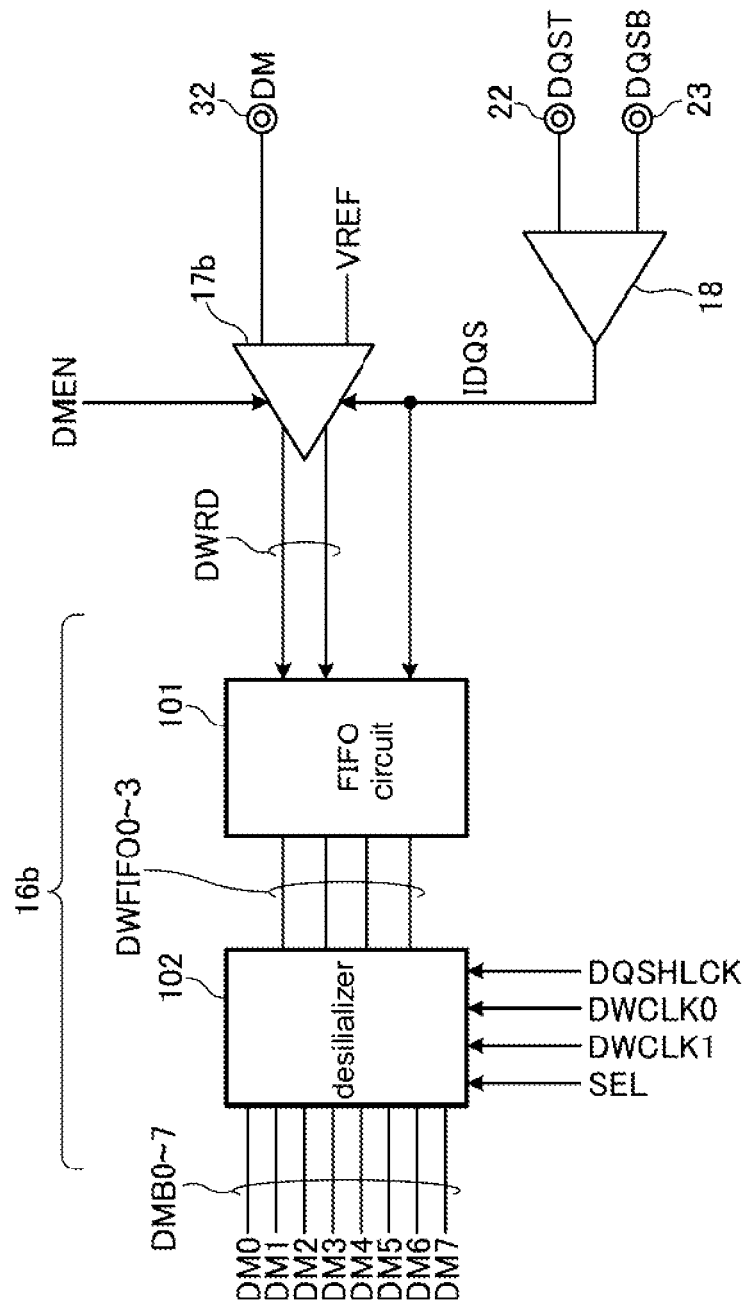
FIG. 6 is a circuit diagram showing a configuration of an input buffer and a serial/parallel conversion circuit according to the embodiment of the present invention.

FIG. 6 is a circuit diagram showing a configuration of the input buffer 17b and the serial/parallel conversion circuit 16b.

As shown in FIG. 6, the input buffer 17b compares a voltage level at the DM/DBI terminal 32, to which the data mask signals DM may be input, with the voltage level of a reference voltage VREF, and thereby generates output signals DWRD. The input buffer 17b is activated by an enable signal DMEN, which is indicative of whether or not a data masking operation is enabled and is supplied from the mode register 42. When DM disable mode is selected, therefore, the input buffer 17b is deactivated regardless whether or not the error check operation is enabled, and accordingly current consumption is suppressed.

When the enable signal DMEN is as high level, that is, the DM enable mode is selected, the input buffer 17b operates in synchronization with an internal strobe signal IDQS provided from a strobe circuit 18. The internal strobe signal IDQS is generated based on complementary external strobe signals DOST and DQSB that are input to the strobe terminals 22 and 23.

The output signals DWRD and internal strobe signal IDQS are supplied to the serial/parallel conversion circuit 16b. The serial/parallel conversion circuit 16b includes a write FIFO circuit 101 and a deserializer 102.

Receiving the output signals DWRD and internal strobe signal IDQS, the write FIFO circuit 101 performs serial/parallel conversion and outputs the data mask signals DM to data mask lines DWFIFO0 to DWFIFO3 with 4-bit wide by time sharing data transfer. Because the data mask signals DM0 to DM7 of 8 bits are burst input to the DM/DBI terminal 32, as described above, the write FIFO circuit 101 transfers the data mask signals DM0 to DM7 of 8 bits to the data mask lines DWFIFO0 to DWFIFO3 4 bits by 4 bits through two cycles of time sharing data transfer.

The data mask signals DM0 to DM7 transferred, via the data mask lines DWFIFO0 to DWFIFO3 are input to the deserializer 102. Performing serial/parallel conversion, the deserializer 102 transfers the data mask signals DM0 to DM7, which are input to the deserializer 102 4 bits by 4 bits through two cycles of time sharing transfer, to data mask lines DMB0 to DMB7 with 8-bit wide. The operation of the deserializer 102 is controlled by clock signals DQSHLCK, DWCLK0, and DWCLK1 and a protection signal SEL.

Figure 7:
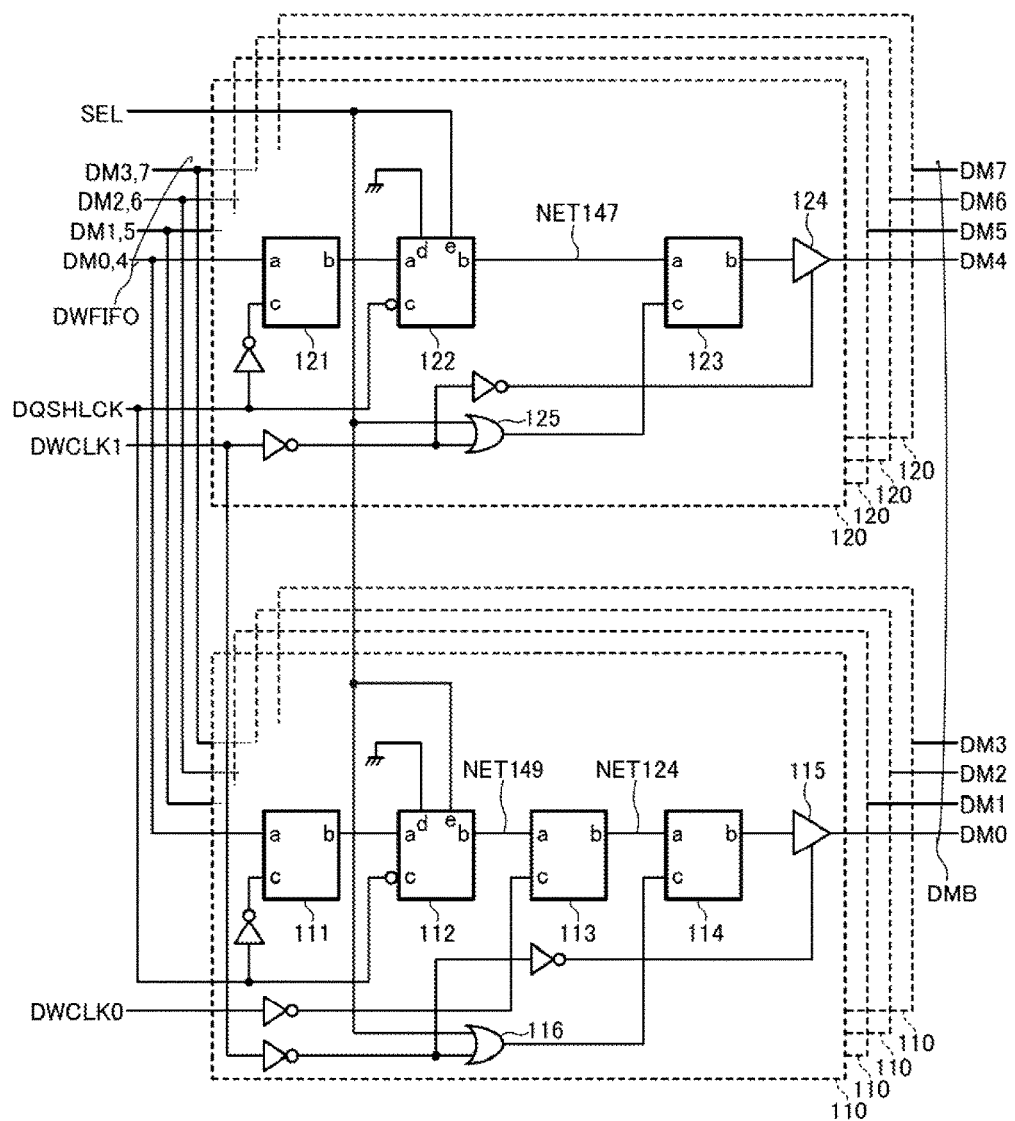
FIG. 7 is a circuit diagram of a deserializer according to the embodiment of the present invention.

FIG. 7 is a circuit diagram of the deserializer 102.

As shown in FIG. 7, the deserializer 102 has four latch circuit blocks 110 coupled to data mask lines DMB0 to DM133, respectively, and four latch circuit blocks 120 coupled to data mask lines DMB4 to DMB7, respectively. The four latch circuit blocks 110 are identical in circuit configuration with one another, and the four latch circuit blocks 120 are also identical in circuit configuration with one another.

Each of the latch circuit blocks 110 has a latch circuit 111, a protection circuit 112, latch circuits 113 and 114, and a tri-state buffer circuit 115 that are connected in series between any one of the corresponding data mask lines DWFIFO0 to DWFIFO3 and any one of the corresponding data mask lines DMB0 to DMB3.

Each of the latch circuits 111, 113, and 114 has an input node a, an output node b, and a selection node c. When a high level signal is input to the selection node c, each latch circuit outputs a signal supplied to its input node a, directly from its output node b. When a signal supplied to the selection node c changes from a high level to a low level, the latch circuit latches a signal supplied to the input node a, and outputs the latched signal from the output node h during a period in which the signal input to the selection node c remains a low level.

The selection node c of the latch circuit 111 receives an inversion signal generated by inverting at clock signal DQSHLCK, the selection node c of the latch circuit 113 receives an inversion signal generated by inverting the clock signal DWCLK0, and the selection node c of the latch circuit. 114 receives a signal from an OR-gate circuit 116. The OR-gate circuit 116 outputs the logical sum of the protection signal SU and a signal generated by inverting the clock signal DWCLK1.

The tri-state buffer circuit 115 is activated when the clock signal DWCLK1 is a high level, and is put in high-impedance state when the clock signal DWCLK1 is a low level. The clock signal DWCLK1 applied to the tri-state buffer circuit 115 passes through two inverter circuits for timing adjustment.

Figure 8:
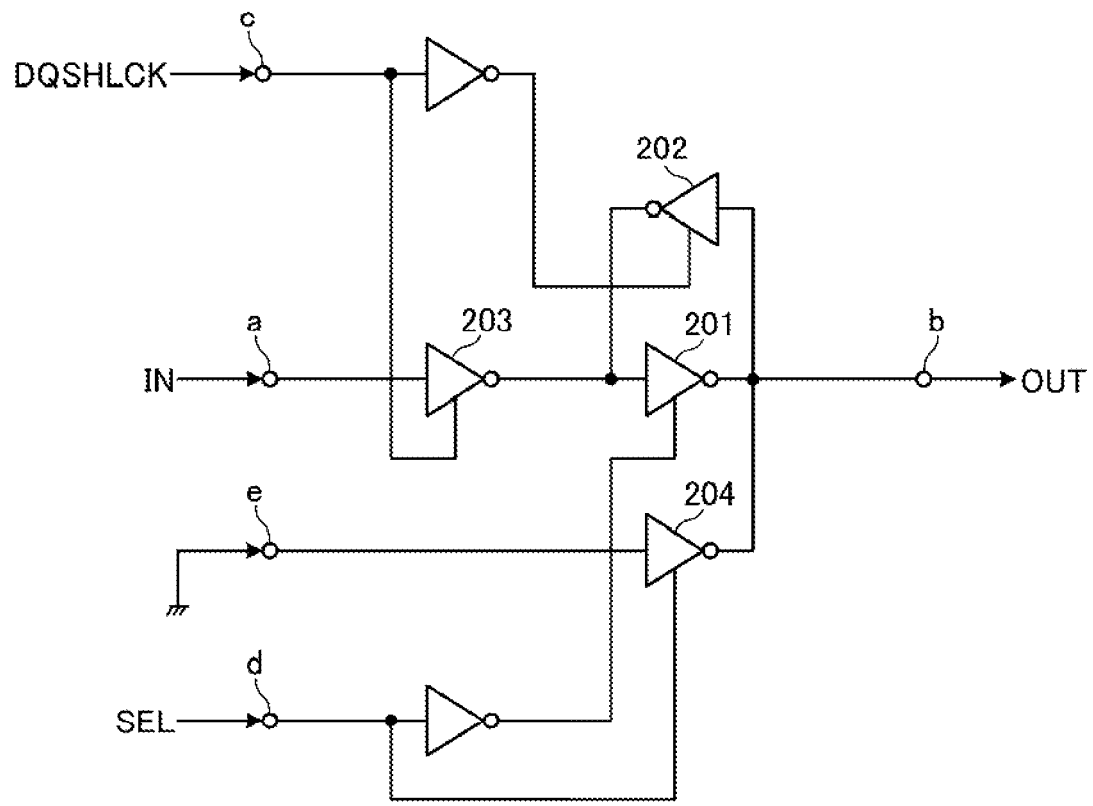
FIG. 8 is a circuit diagram of a protection circuit according to the embodiment of the present invention.

FIG. 8 is a circuit diagram of the protection circuit 112.

As shown in FIG. 8, the protection circuit 112 has an input node a, an output node b, and selection nodes c to e. The input node a is coupled to the output node b of the latch circuit 111 located in the front stage to the protection circuit 112, and the output node b is connected to the input node a of the latch circuit 113 located in the rear stage to the protection circuit 112. The selection node e receives the clock signal DQSHLCK, the selection node d receives the protection signal SEL, and the selection node c is kept at a low level.

The protection circuit 112 includes inverter circuits 201 and 202 coupled circularly to each other an inverter circuit 203 placed between the input node a and the input node of the inverter circuit 201, and an inverter circuit 204 placed between the selection node e and the output node b. The inverter circuits 201 to 204 are tri-state types, and are activated when the corresponding selection signals are high levels. The protection signal SEL and an inversion signal generated by inverting the protection signal SEL are used as an activation signal for the inverter circuits 204 and an activation signal for the inverter circuits 201, respectively. The clock signal DQSHLCK and an inversion signal generated by inverting the clock signal DQSHLCK are used as an activation signal for the inverter circuits 203 and an activation signal for the inverter circuits 202, respectively.

In this configuration, when the protection signal SF1 is a low level (deactivated state), the protection circuit 112 outputs a signal input to the input node a, directly from the output node h when the clock signal DQSHLCK is a high level. When the clock signal DQSHLCK changes from a high level to a low level, the protection circuit 112 latches a signal input to the input node a, and outputs the latched signal from the output node b during a period in which the clock signal DQSHLCK remains a low level.

When the protection signal SEE is a high level (activated state), on the other hand, the inverter circuit 201 is put in high-impedance state and the inverter circuit 204 is put in activated state. As a result, a high level signal is output from the output node b of the protection circuit 112.

Each of the latch circuit blocks 120 has a latch circuit 121, a protection circuit 122, a latch circuit 123, and a tri-state buffer circuit 124 that are connected in series between any one of the corresponding data mask lines DWFIFO0 to DWFIFO3 and any one of the corresponding data mask lines DMB4 to DMB7.

Each of the latch circuits 121 and 123 has an input node a, an output node b, and a selection node c, and has the same function as that of the latch circuits 111, 113, and 114. The selection node c of the latch circuit 121 is supplied with an inversion signal generated by inverting a clock signal DQSHLCK, and the selection node c of the latch circuit 123 is supplied with an output signal from an OR-gate circuit 125, The OR-gate circuit 125 outputs the logical sum of the protection signal SEE and an inversion signal generated by inverting the clock signal DWCLK1.

The tri-state buffer circuit 124 is activated when the clock signal DWCLK1 is a high level, and is put in high-impedance-carrying state when the clock signal DWCLK1 is a low level. The clock signal DWCLK1 input to the tri-state buffer circuit 124 passes through two inverter circuits for timing adjustment.

The protection circuit 122 is the same in circuit configuration as the protection circuit 112 of FIG. 8 except that the protection circuit 122 has the input node a coupled to the output node b of the latch circuit 121 and the output node b connected to the input node a of the latch circuit 123. Signals input to the selection nodes c to e of the protection circuit 122 are therefore the same as signals input to the selection nodes c to e of the protection circuit 112.

In this configuration, when the protection signal SEL is as low level (deactivated state), the protection circuit 122 carries out the same latch operation as the protection circuit 112 does. When the protection signal SEL is a high level (activated state), a high level signal is output from the output node b of the protection circuit 122.

The above configuration of the input buffer 17b and serial/parallel conversion circuit 16b that process the data mask signals DM is basically the same as the configuration of the input buffer 17a and serial/parallel conversion circuit 16a that process the write data DQ. However, the input buffer 17a that processes the write data DQ is activated regardless of the enable signal DMEN, and the serial/parallel conversion circuit 16a that processes the write data DQ is not provided with the protection circuits 112 and 122.

Figure 9:
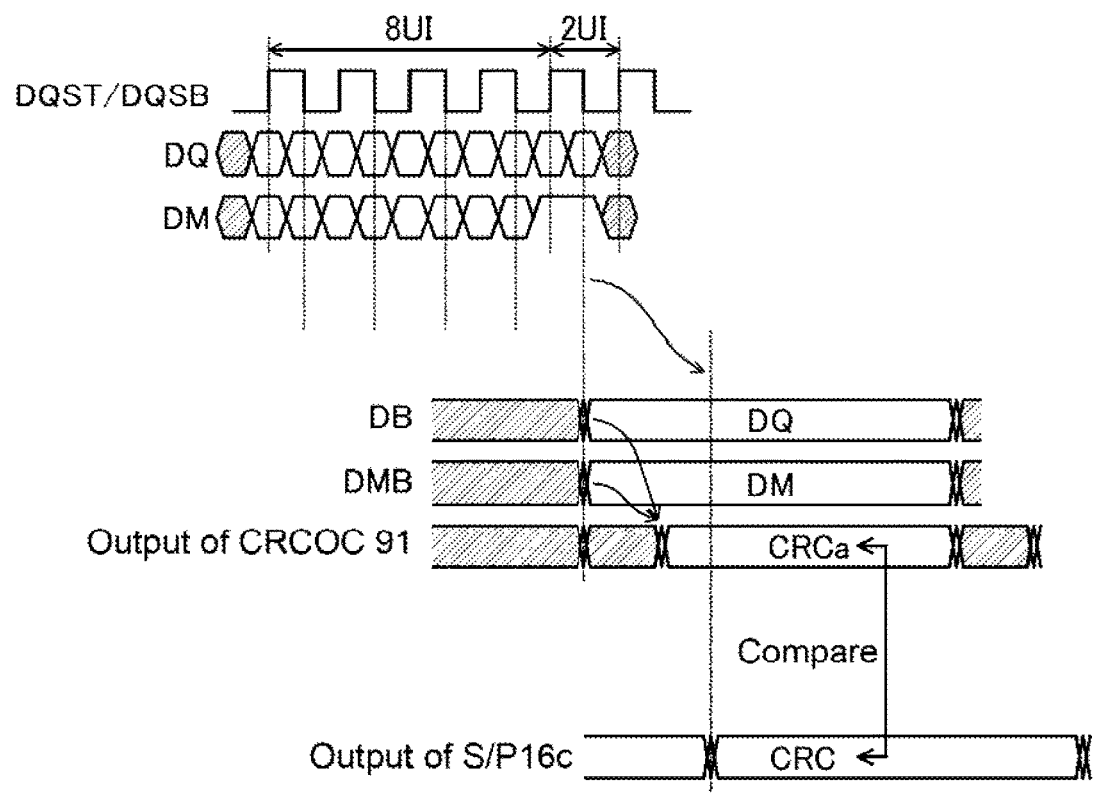
FIG. 9 is a first timing chart according, to the embodiment of the present invention.

FIG. 9 is a timing chart for explaining an effect of this embodiment, showing a case where the operation mode in which the data masking operation is enabled and the error check operation is enabled.

In this case, in synchronization with external strobe signals DQST and DQSB, the write data DQ and the data mask signals DM are burst input from the external controller 210 to the semiconductor device 10. The error check circuit 90 of FIG. 5 performs CRC operation using the write data DQ and the data mask signals DM, and compares generated CRC codes with CRC codes supplied from the controller 210. Through this process, an error included in the write data DQ or data mask signals DM can be detected.

Figure 10:
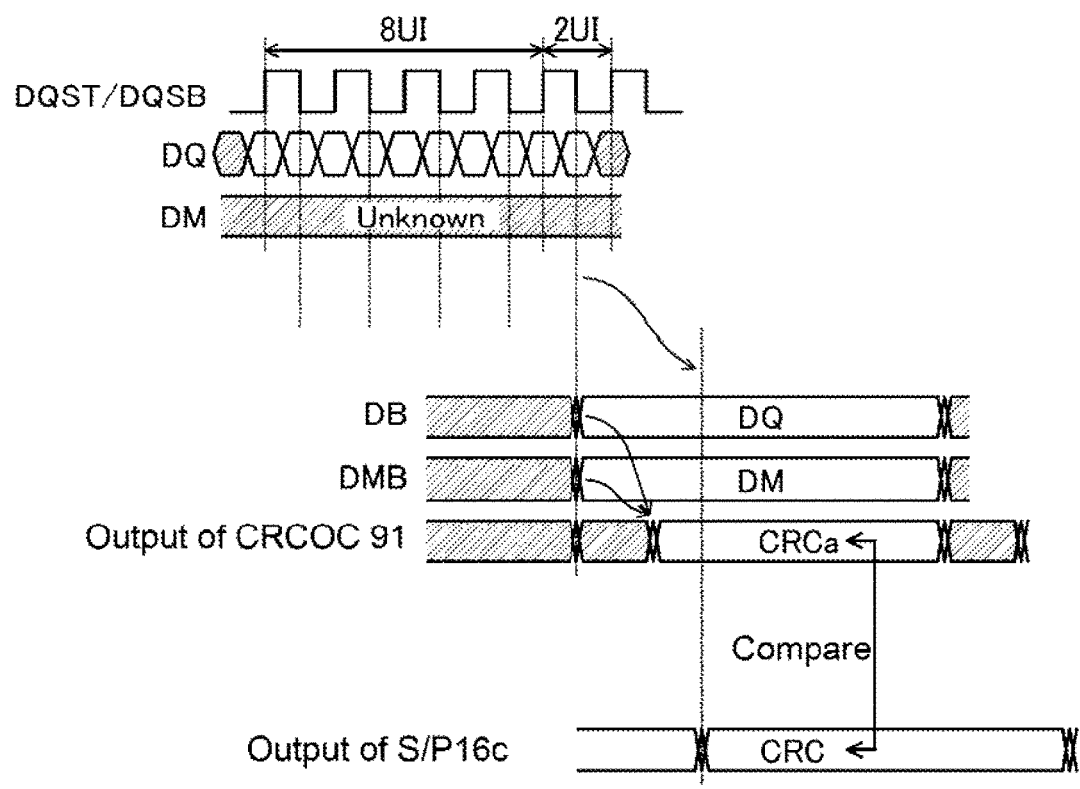
FIG. 10 is a second timing chart according to the embodiment of the present invention.

FIG. 10 is a second timing chart for explaining an effect of this embodiment, showing a case where the data masking operation is disabled and the error check operation is enabled.

In this case, although the write data DQ are burst input from the external controller 210 to the semiconductor device 10 in synchronization with the external strobe signals DQST and DQSB, input of the data mask signals DM is not guaranteed because the data masking operation is disabled. It is therefore unknown whether the values of the incoming data mask signals DM from the controller 210 correctly match the incoming CRC codes from the controller 210 or not. Because CRC codes are generated on the assumption that signals not used for actual operations (data mask signals DM in this case) among signals used for CRC operation are high levels.

In such a case, according to this embodiment, high level data mask signals DM are internally generated. This allows the semiconductor device 10 to perform correct CRC operation even if high level data mask signals DM are not supplied to the semiconductor device 10 by the controller 210.

Figure 11:
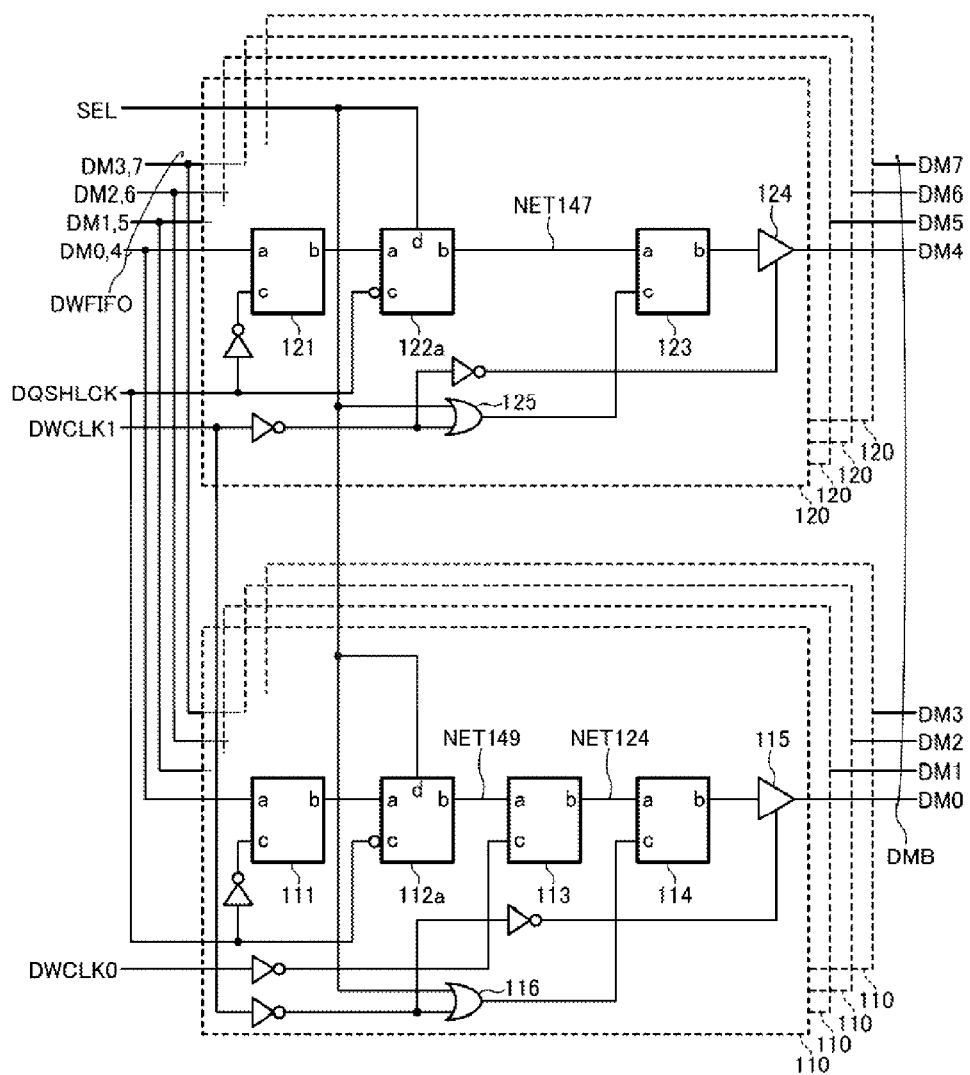
FIG. 11 is a circuit diagram of the deserializer according to the embodiment of the present invention.

FIG. 11 is a circuit diagram of the deserializer 102 according to another embodiment of the present invention.

The deserializer 102 shown in FIG. 11 is different from the deserializer 102 of FIG. 7 in that the protection circuits 112 and 122 are replaced with protection circuits 112a and 122a, The deserializer 102 of FIG. 11 is the same as the deserializer 102 of FIG. 7 in other respects. The same constituent elements as described in FIG. 7, therefore, will be denoted by the same reference numerals and overlapping, description will be omitted.

Each of the protection circuits 112a and 122a has a configuration given by eliminating the selection node e from each of the protection circuits 112 and 122, and serves as a latch circuit having a setting function of setting the output node b to a high level when the protection signal SEL becomes a high level. Using, these protection circuits 112a and 122a also realizes the same function as that of the deserializer 102 of FIG. 8.

In the above embodiment, the deserializer 102 has the function of internally generating the data mask signals DM, but the present invention is not limited to this embodiment. A circuit different from the deserializer 102, e.g., the write FIFO circuit 101 may have such a function.

Figure 12:
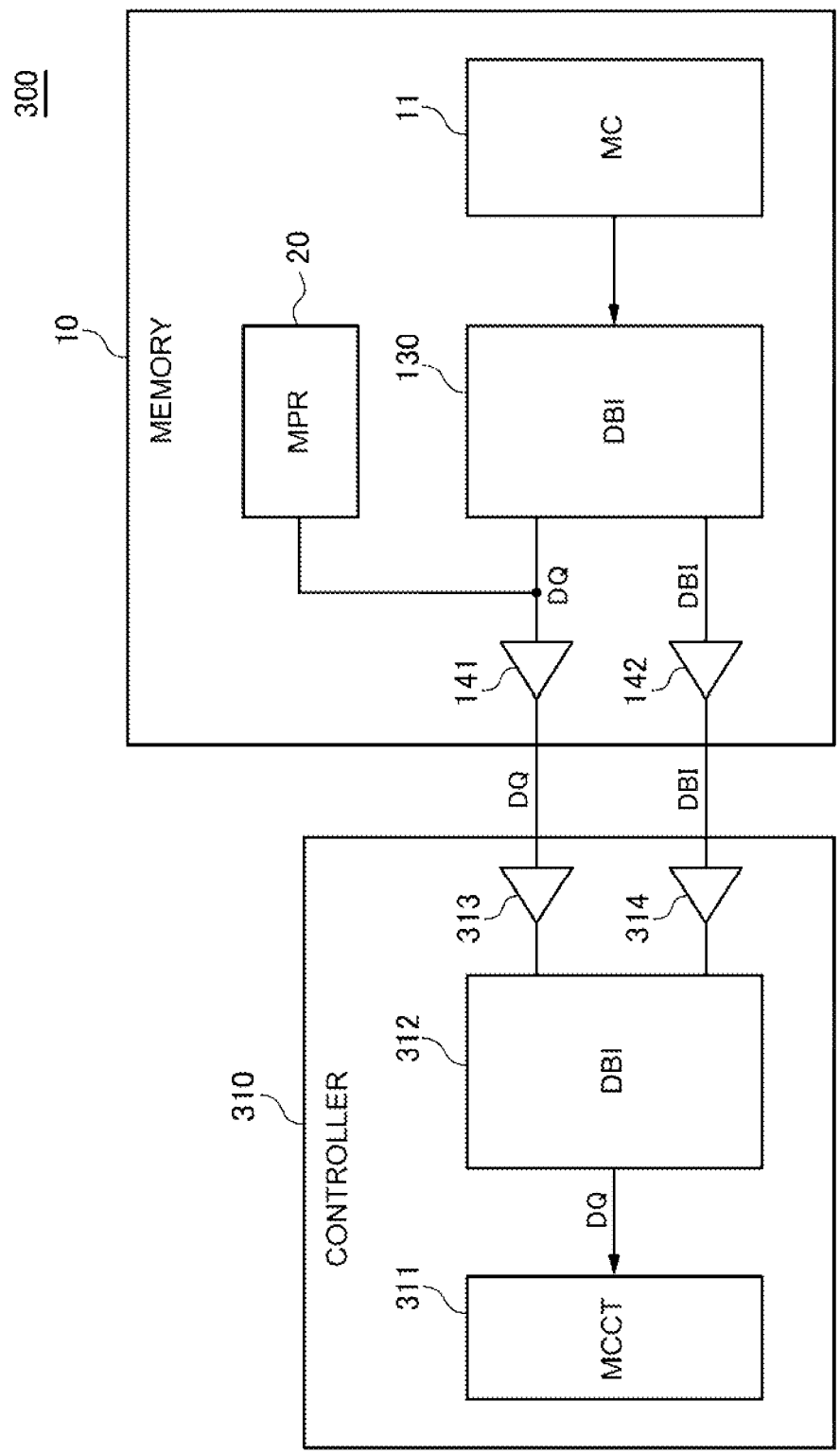
FIG. 12 is a functional block diagram of a data processing system including the semiconductor device according to another embodiment of the present invention.

FIG. 12 is a functional block diagram of a data processing system 300 including the semiconductor device 10 according to a second embodiment of the present invention.

The data processing system 300 shown in FIG. 12 is composed of the semiconductor device 10 of FIG. 1 and a controller 310 that controls the semiconductor device 10. The semiconductor device 10 includes a data bus inversion circuit 130 that inverts part or the whole of read data DQ output from the memory cell array 11, according to the data pattern of the read data DQ. In other words, the data bus inversion circuit 130 performs a data bus inversion operation. The read data DQ having passed through the data bus inversion circuit 130 is supplied to the controller 310 via an output buffer 141. Data bus inversion signals DBI indicative of whether the read data DQ has been inverted or not are supplied to the controller 310 via an output buffer 142.

The controller 310 has a data bus inversion circuit 312 that receives the read data DQ and the data bus inversion signals DBI that are supplied to the data bus inversion circuit 312 via receivers circuits 313 and 314, respectively. The controller 310 further has a main circuit 311 that receives the read data DQ having been re-inverted into its original state by the data bus inversion circuit 312. When the data bus inversion signals DBI are activated, the data bus inversion circuit 312 inverts the logical level of the incoming read data DQ, and thereby re-inverts the read data DQ into its original state. The receiver circuit 314 that receives the data bus inversion signals DBI is activated when a data bus inversion function is enabled.

FIGS. 13(A) and 13(B) are diagrams for explaining the function of the data bus inversion circuit 130, including FIG. 13(A) showing the values of read data DQ input to the data bus inversion circuit 120 and FIG. 13(B) showing the values of read data DQ and data bus inversion signals DBI output from the data bus inversion circuit 130. FIGS. 13(A) and 13(B) depict a case where the number of hits (m) making up data processed by the data input/output terminal 21 is 8 and the burst length (n) of the data is 8 bits.

As shown in FIG. 13(B), for each burst output timing, the data bus inversion signals DBI of one hit are assigned. In the example of FIGS. 13(A) and 13(B), therefore, the data bus inversion signals DM are made up of 8 bits. All logical levels of the 8-bit read data DQ that correspond to burst output timings at which data bus inversion signals DBI are at active levels (low levels in this example) are inverted. In the example of FIG. 13(B), bits corresponding to burst output timings D0 to D4 are at inactive levels (high level)s, while hits corresponding to burst output timings D5 to D7 are at active levels (low levels). It is hence observed that the logic levels of the read data at the burst output timings D5 to D7 shown in FIG. 13(A) are inverted in FIG. 13(B).

The semiconductor device 10 of this embodiment will hereinafter be described more specifically by focusing on the read operation.

Figure 14:
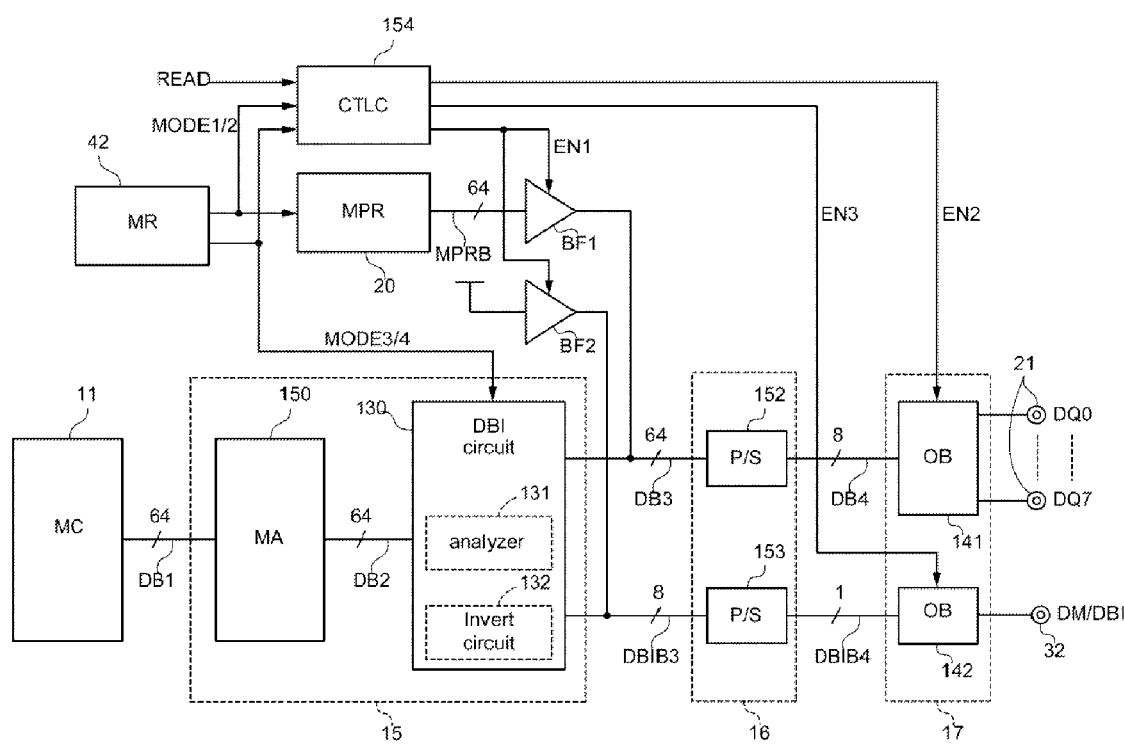
FIG. 14 is a functional block diagram of a part of the semiconductor device that is related to a read operation according to the embodiment of the present invention.

FIG. 14 is a block diagram of a part of semiconductor device 10 that is related to the read operation.

When the number of bits (m) making up data processed by the data input/output terminal 21 is 8 and the burst length (n) of the data is 8 bits, as described above, a data line DB1 connecting the memory cell array 11 to the data controller 15 is configured to 64-bit wide, as shown in FIG. 14. The data controller 15 includes an amplifying circuit 150 and the data bus inversion circuit 130, which are connected to each other via a 64-bit wide data line DB2.

The data bus inversion circuit 130 has an analyzer 131 that analyzes the data pattern of the read data DQ, and thereby generates the data bus inversion signals DBI, and the data bus inversion circuit 130 further has an invert circuit 132 that inverts the read data DQ based on the data bus inversion signals DBI. The data bus inversion circuit 130 is activated when a mode signal MODE3/4 supplied from the mode register 42 indicates the data bus inversion function is enabled. The read data DQ output from the invert circuit 132 is transferred through a 64-bit wide data line DB3 and is supplied to a parallel/serial conversion circuit 152 included in the FIFO circuit 16. The data bus inversion signals DBI generated by the analyzer 131 are transferred through an 8-bit wide data bus inversion line DBIB3 and are supplied to a parallel/serial conversion circuit 153 included in the FIFO circuit 16.

Figure 15:
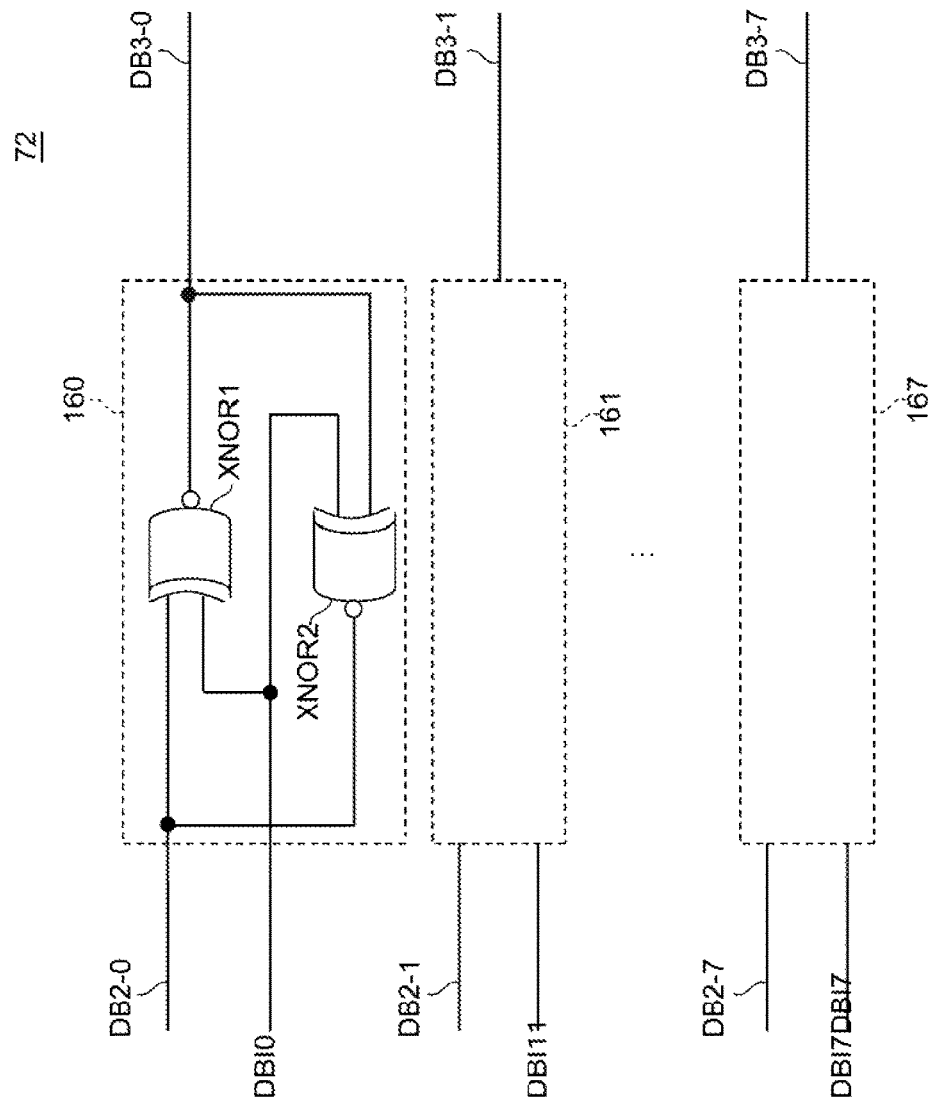
FIG. 15 is a circuit diagram of as part of an invert circuit according to the embodiment of the present invention.

FIG. 15 is a circuit diagram showing a part of the invert circuit 132 included in the data bus inversion circuit 130.

As shown in FIG. 15, the invert circuit 132 has invert circuits 160 to 167 connected between data lines DB2-$i$ ($i$=0 to 7) and data lines DB3-$i$ ($i$=0 to 7), respectively. Each of these invert circuits 160 to 167 inverts or does not invert incoming read data DQ0 from the data line DB2-$i$ and outputs the inverted or non-inverted read data DQ to the data line DB3-$i$, and inverts or does not invert incoming write data DQ0 from the data line DB3-*i* and outputs the inverted or non-inverted write data DQ to the data line DB2-*i*.

Specifically, the invert circuit 160 has exclusive-OR circuits XNOR1 and XNOR2 that receive a data bus inversion signal DBI0. When the data bus inversion signal DBI0 is a high level, a data line DB2-0 and a data line DB3-0 are at the same logical level. When the data bus inversion signal DBI0 is a low level, the data line DB2-0 and the data line DB3-0 are at logical levels opposite to each other.

Data bus inversion signals DBI0 to DBI7 are each assigned as one-bit signal plural read data and write data that are input and output simultaneously. The read data DQ0 supplied to the data lines DB2-0 to DB2-7 is 8-bit read data to be burst output, that is, a burst of read data to be output at different timings. Likewise, write data DQ0 supplied to the data lines DB3-0 to DB3-7 is burst input 8-bit write data, that is, a burst of write data input at different timings. As shown in FIG. 15, therefore, the data bus inversion signals DBI0 to DBI7 are assigned to the data lines DB2-0 to DB2-7 (data lines DB3-0 to DB3-7), respectively, as signals different from each other.

FIG. 14 is referred to again. The parallel/serial conversion circuit 152 performs Parallel/serial conversion of the read data DQ supplied to the parallel/serial conversion circuit 152 via the 64-bit wide data line DB3 and outputs the converted read data DQ serially to an 8-bit wide data line DB4. The read data DQ is then further transferred through the data line DB4 to the output buffer 141, which outputs the read data DQ front the data input/output terminal 21. In the same manner, the parallel/serial conversion circuit 153 performs parallel/serial conversion of the data bus inversion signals DB1 (DBI0 to DBI7) supplied to the parallel/serial conversion circuit 153 via the 8-bit wide data bus inversion line DBIB3. The converted data bus inversion signals DBI are output serially to a 1-bit wide data bus inversion line DBIB4. The data bus inversion signals DBI are then further transferred through the data bus inversion line DBIB4 to the output buffer 142, which outputs the data bus inversion signal DBI from the DM/DBI terminal 32.

As shown in FIG. 14, the mode signal MODE1/2 is supplied from the mode register 42 to the multi-purpose register 20. When the mode signal MODE1/2 indicates the multi-purpose register 20 is used, the multi-purpose register 20 is activated.

Test data DQ read out of the multi-purpose register 20 is supplied to the buffer circuit BF1 via a 64-bit wide data line MPRB. The buffer circuit BF1 is activated in response to an enable signal EN1 output from a control circuit 154. An output signal from the buffer circuit BF1 is supplied to the data line DB3. When the enable signal EN1 is activated, test data DQ read out of the multi-purpose register 20 appears on the data line DB3 instead of read data DQ read out of the memory cell array 11.

The buffer circuit BF2 is connected to the data bus inversion line DBIB3. When activated by the enable signal EN1, the buffer circuit BF2 supplies the data bus inversion signals DBI fixed to a given value (a high level), to the data bus inversion line DBIB3. When the enable signal EN1 is activated, therefore, all lines making up the 8-bit wide data bus inversion line DBIB3 are fixed to a high level.

The control circuit 154 receives the mode signals MODE1/2 and MODE3/4 supplied from the mode register 42 and a read enable signal READ supplied from the control logic, circuit 44 of FIG. 1, and activates enable signals EN1 to EN3 based on the mode signals and read enable signal. The read enable signal READ is activated when a read command is issued from the controller 310.

The operation of the control circuit 154 will be described more specifically, referring to FIG. 16. Under a condition A where the mode signal MODE1/2 indicates an operation mode in which the multi-purpose register 20 is used, and the mode signal MODE3/4 indicates an operation mode in which the data bus inversion function is used, the control circuit 154 activates the enable signals EN1 to EN3 in response to the read enable signal READ. As a result, the test data DQ is output from the data input/output terminal 21 and the DM/DBI terminal 32 is fixed to a high level.

Under a condition B where the mode signal MODE1/2 indicates an operation mode in which the multi-purpose register 20 is not used, and the mode signal MODE3/4 indicates the operation mode in which the data bus inversion function is used, the control circuit 154 activates the enable signals EN2 and EN3 in response to the read enable signal READ. As a result, the read data DQ is output from the data input/output terminal 21 and the data bus inversion signals DBI are output from the DM/DBI terminal 32.

Under a condition C where the mode signal MODE1/2 indicates the operation mode in which the multi-purpose register 20 is not used, and the mode signal MODE3/4 indicates an operation mode in which the data bus inversion function is not used, the control circuit 154 activates the enable signal EN2 in response to the read enable signal READ. As a result, the read data DQ is output from the data input/output terminal 21 and the DM/DBI terminal 32 is put in high-impedance-carrying state.

Under a condition D where the mode signal MODE1/2 indicates the operation mode in which the multi-purpose register 20 is used, and the mode signal MODE3/4 indicates the operation mode in which the data bus inversion function is not used, the control circuit 154 activates the enable signals EN1 and EN2 in response to the read enable signal READ. As a result, the test data DQ is output from the data input/output terminal 21 and the data bus inversion terminal 32 is put in high-impedance-carrying state.

Figure 17:
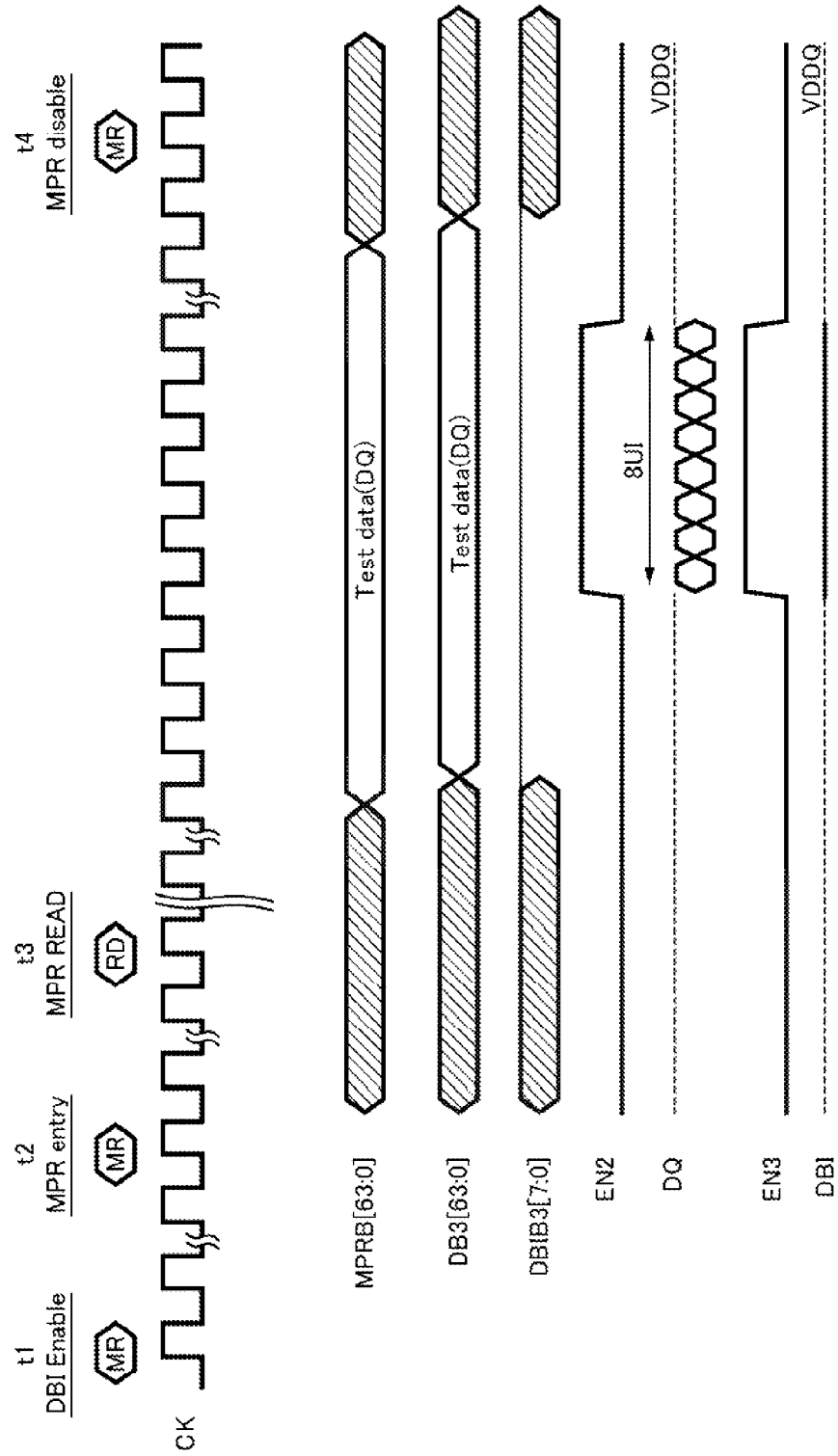
FIG. 17 is a timing chart showing a training operation of the semiconductor device according to the embodiment of the present invention.

FIG. 17 is a timing chart for explaining a training operation of the semiconductor device 10 of this embodiment.

In the example of FIG. 17, a mode register set command MR is issued at time t1 in synchronization with the external clock signal CK. As a result, the data bus inversion function in its disabled state switches to enabled state.

Subsequently, a mode register set command MR is issued at time t2, which causes switchover to the operation mode in which the multi-purpose register is used. The resulting condition is the condition A of FIG. 16.

In this condition, when the read command MR is issued at time 6, access is made not to the memory cell array 11 but to the multi-purpose register 20. Because the enable signal EN1 is activated in this condition, the test data DQ saved in the multi-purpose register 20 is read out and transferred to the data line DB3. Meanwhile, all lines making up the data bus inversion line DBIB3 are fixed to a high voltage level by the buffer circuit BF2.

Subsequently, the enable signals EN2 and EN3 are activated. As a result, the test data DQ is burst output from the data input/output terminal 21 as the DM/DBI terminal 32 is fixed to a high level.

A mode register set command MR is then issued at time t4, which causes switchover to the operation mode in which the multi-purpose register is not used. Hence the conditions at time t1 to time t2 are restored.

In this manner, according to the semiconductor device 10 of this embodiment, the DM/DBI terminal 32 is fixed to a high level under the condition A mentioned above. The semiconductor device 10, therefore, is able to perform the training operation correctly.

Preferred embodiments of the present invention have been described above. The present invention is not limited to the above embodiments but may be modified into various forms of applications on the condition that the modification does not deviate from the substance of the invention. It is obvious that modified forms of applications are also included in the scope of the present invention.

For example, the above embodiments relate to cases where the present invention is applied to the DRAM. The present invention, however, is applied not only to the DRAM but also to various semiconductor memories, such as SRAM, PRAM, ReRAM, MRAM, FeRAM, NAND-type flash memory, and NOR-type flash memory.

What is claimed:

1. An apparatus comprising:
    a first external terminal configured to receive at least one of data mask information and data bus inversion information;
    a first circuit configured to perform one of an error check operation and a data bus inversion operation and configured to output a first control signal based on the error check operation being enabled and the data bus inversion operation being disabled, the data bus inversion operation associated with the data mask information;
    a signal line coupled between the first external terminal and the first circuit; and
    a second circuit coupled to the signal line and configured to provide a voltage level at the signal line at a constant level responsive to the first control signal.

2. The apparatus as claimed in claim 1, further comprising a conversion circuit configured to perform a serial/parallel conversion operation on the at least one of data mask information and data bus inversion information, and wherein the conversion circuit comprises the second circuit.

3. The apparatus as claimed in claim 1, further comprising a conversion circuit configured to perform a serial/parallel conversion operation on the at least one of data mask information and data bus inversion information, and wherein the signal line comprises first and second portions, the first portion being between the first external terminal and the conversion circuit and the second portion being between the conversion circuit and the first circuit, the second circuit configured to provide a voltage level at the first portion of the signal line at the constant level responsive to the first control signal.

4. The apparatus as claimed in claim 3, wherein the first portion of the signal line includes a first number of lines and a second portion of the signal line includes a second number of lines, and wherein the second number is greater than the first number.

5. The apparatus as claimed in claim 1, further comprising a second external terminal configured to receive data, and wherein the first circuit is configured to perform the error check operation based, at least in part, on both of the data and a logic level of the first signal line.

6. The apparatus as claimed in claim 1, further comprising a first register circuit configured to provide the first control signal.

7. The apparatus as claimed in claim 6, further comprising an input buffer coupled the first external terminal at an input node thereof and the signal line at an output node thereof, the input buffer configured to be inactivated responsive to a second control signal, and wherein the first register circuit is further configured to provide the second control signal.

8. The apparatus as claimed in claim 7, wherein the register circuit is configured to provide the first control signal and the second control signal while the error check operation is enabled and to not provide the first control signal and the second control signal while the error check operation is disabled.

9. The apparatus as claimed in claim 6, further comprising;
    a second external terminal configured to receive data;
    a data line coupled to the second external terminal;
    a memory cell array coupled to a second signal line and configured to provide the data to the second external terminal via the data line; and
    a second register coupled to the second signal line and configured to provide the data to the second external terminal via the data line, and
    wherein the first register is configured to provide the first control signal at least while the second register is providing the data to the second external terminal.

10. The apparatus as claimed in claim 6, further comprising a control circuit configured to provide a second control signal responsive, at least in part, to the first control signal, and wherein the second circuit is configured to provide the voltage level of the signal line at the constant level responsive to the second control signal and render the signal line into high impedance.

11. The apparatus as claimed in claim 10, wherein the second circuit includes a tri-state buffer circuit.

12. The apparatus as claimed in claim 10, further comprising;
    a second external terminal configured to receive data;
    a data line coupled to the second external terminal;
    a memory cell array coupled to a second signal line and configured to provide the data to the second external terminal via the data line; and
    a second register coupled to the second signal line and configured to provide the data to the second external terminal via the data line, and
    wherein the control circuit provides the second control signal in the first state at least while the second register is providing the data to the second external terminal and the data bus inversion operation is enabled and provide the second control signal in the second state at least while the second register is providing the data to the second external terminal and the data bus inversion operation is disabled.

13. The apparatus as claimed in claim 1, further comprising:
    a memory device including the first external terminal, the first circuit, the signal line and the second circuit; and
    a memory controller comprises;
        a second external terminal coupled to the first external terminal of the memory device; and
        a third circuit coupled to the second external terminal and configured to perform the one of the error check operation and the data bus inversion operation.

14. The apparatus as claimed in claim 1, wherein the second circuit configured to provide a high voltage level at the signal line responsive to the first control signal having a high voltage level.

15. The apparatus as claimed in claim 1, wherein the second circuit configured to provide a high-impedance state during a period in which the first control signal remains at a low voltage level.

16. A method comprising:
- registering information in a mode register to perform one of an error check operation and a data bus inversion operation;
- providing, from the mode register, a first control signal to a control circuit of a semiconductor device, the first control signal based on the error check operation being enabled and the data bus inversion operation being disabled; and
- responsive to the first control signal, providing a voltage level of a signal line coupled to a first external terminal at a constant level, the first external terminal configured to receive data mask information and data bus inversion information.

17. The method as claimed in claim 16, further comprising:
- performing the error check operation based, at least in part, on a logic level associated with provided voltage on the signal line.

18. The method as claimed in claim 17, further comprising:
- performing the error check operation further based, at least in part, on data that is provided to a second external terminal.

19. The method as claimed in claim 17, wherein the error check operation includes a CRC operation.

20. The method as claimed in claim 16, wherein the error check operation includes an ECC operation.

* * * * *